US008937749B2

(12) United States Patent
Li (10) Patent No.: US 8,937,749 B2
(45) Date of Patent: Jan. 20, 2015

(54) INTEGRATED COLOR DETECTION AND COLOR PIXEL COUNTING FOR BILLING (75) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 238 days.

(21) Appl. No.: 13/416,832

(22) Filed: Mar. 9, 2012

(65) Prior Publication Data
US 2013/0235395 A1 Sep. 12, 2013

(51) Int. Cl.
G06K 15/00 (2006.01)

(52) U.S. Cl.
USPC ............... 358/2.1; 358/1.18; 399/79; 705/52; 705/400; 705/408

(58) Field of Classification Search
USPC .............. 358/1.9, 2.1, 1.15, 1.18; 399/16, 79; 705/52, 408, 34, 400
See application file for complete search history.

(56) References Cited

U.S. PATENT DOCUMENTS

| 4,065,031 | A | 12/1977 | Wiggins et al. |
| 4,890,165 | A | 12/1989 | Hasegawa |
| 5,204,699 | A | 4/1993 | Birnbaum et al. |
| 5,287,204 | A | 2/1994 | Koizumi et al. |
| 5,345,315 | A | 9/1994 | Shalit |
| 5,469,276 | A | 11/1995 | Shu |
| 5,479,584 | A | 12/1995 | Curry |
| 5,612,795 | A | 3/1997 | Dichter |
| 5,642,202 | A | 6/1997 | Williams et al. |
| 5,739,841 | A | 4/1998 | Ng |
| 5,828,461 | A | 10/1998 | Kubo |
| 5,845,056 | A | 12/1998 | Kohler |
| 5,867,198 | A | 2/1999 | Gwaltney et al. |
| 6,035,103 | A | 3/2000 | Zuber |
| 6,057,931 | A | 5/2000 | McConnell |
| 6,064,838 | A | 5/2000 | Maruta et al. |
| 6,115,138 | A | 9/2000 | Yanaka |
| 6,157,469 | A | 12/2000 | Mestha |
| 6,185,005 | B1 | 2/2001 | Yoo |
| 6,240,205 | B1 | 5/2001 | Fan et al. |
| 6,344,906 | B1 | 2/2002 | Gatto et al. |

(Continued)

FOREIGN PATENT DOCUMENTS

| GB | 2 240 897 | 8/1991 |
| JP | 2004-136676 | 5/2004 |

(Continued)

OTHER PUBLICATIONS

Ashlee Vance, New Inks Cut Costs of Office Color Printing, www.newyorktimes.com, May 6, 2009.

(Continued)

Primary Examiner — Jamares Q Washington
(74) Attorney, Agent, or Firm — Pillsbury Winthrop Shaw Pittman, LLP (57) ABSTRACT Disclosed herein are a method and an image processing apparatus implementing the method for color pixel counting in documents by integrating color detection and counting. The method determines if pixels are neutral (e.g., gray) or non-neutral (i.e., color). Windows are used to analyze the pixels. For each window, a number of pixels with at least one color plane ON are counted, as well as a number of ON pixels in each color plane. The windows are determined to be neutral or color. A billable count of color pixels is determined based on the neutrality of the windows. Based on the billable count of color pixels, a bill for outputting the document is determined.

20 Claims, 5 Drawing Sheets

(56) References Cited

U.S. PATENT DOCUMENTS

| | | |
|---|---|---|
| 6,351,558 B1 | 2/2002 | Kuwata |
| 6,351,566 B1 | 2/2002 | Zlotnick |
| 6,377,304 B1 | 4/2002 | Saitoh |
| 6,493,019 B1 | 12/2002 | Hirasawa |
| 6,516,157 B1 | 2/2003 | Maruta et al. |
| 6,519,571 B1 | 2/2003 | Guheen et al. |
| 6,580,525 B1 | 6/2003 | Iwakiri |
| 6,757,424 B2 | 6/2004 | Love |
| 6,844,937 B2 | 1/2005 | Dempsey et al. |
| 6,972,857 B2 | 12/2005 | Mantell et al. |
| 7,031,019 B1 | 4/2006 | Sakurai |
| 7,142,733 B1 | 11/2006 | Nakagawa |
| 7,440,138 B1 | 10/2008 | Hofman |
| 7,755,800 B2 | 7/2010 | Malik et al. |
| 7,903,285 B2 | 3/2011 | Malik et al. |
| 7,907,305 B2 | 3/2011 | Malik et al. |
| 8,117,134 B2 | 2/2012 | Campbell et al. |
| 2002/0032027 A1 | 3/2002 | Kirani et al. |
| 2002/0136560 A1 | 9/2002 | Sadowara et al. |
| 2003/0140315 A1 | 7/2003 | Blumberg et al. |
| 2003/0206307 A1* | 11/2003 | Handley et al. ............ 358/1.9 |
| 2004/0012644 A1 | 1/2004 | Allen et al. |
| 2004/0119977 A1 | 6/2004 | Takahashi |
| 2005/0024669 A1 | 2/2005 | Aoki |
| 2005/0151769 A1 | 7/2005 | Yeh |
| 2005/0174591 A1 | 8/2005 | Sowinski et al. |
| 2005/0206982 A1 | 9/2005 | Hattori |
| 2005/0219390 A1 | 10/2005 | Tajima et al. |
| 2005/0226503 A1 | 10/2005 | Bailey et al. |
| 2005/0243341 A1 | 11/2005 | Ng |
| 2006/0101523 A1 | 5/2006 | Talbert |
| 2008/0079967 A1 | 4/2008 | He |
| 2008/0088860 A1 | 4/2008 | Yoshida |
| 2008/0106569 A1 | 5/2008 | Suwa |
| 2009/0099980 A1 | 4/2009 | Ni et al. |
| 2009/0109454 A1 | 4/2009 | Nagarajan et al. |
| 2009/0195799 A1 | 8/2009 | Malik et al. |
| 2009/0195800 A1 | 8/2009 | Malik et al. |
| 2009/0195801 A1* | 8/2009 | Malik et al. ............ 358/1.9 |
| 2009/0226082 A1 | 9/2009 | Li |
| 2010/0005038 A1 | 1/2010 | Nagarajan et al. |
| 2010/0088201 A1 | 4/2010 | Nagarajan et al. |
| 2010/0100505 A1 | 4/2010 | Campbell et al. |
| 2010/0245412 A1 | 9/2010 | Page et al. |
| 2010/0280929 A1 | 11/2010 | Coffey et al. |

FOREIGN PATENT DOCUMENTS

| | | |
|---|---|---|
| JP | 2004-356796 | 12/2004 |
| JP | 2006-340221 | 12/2006 |
| JP | 2007-336007 | 12/2007 |
| JP | 2008-85731 | 4/2008 |
| WO | WO 01/60051 | 8/2001 |

OTHER PUBLICATIONS

Xerox Corporation, Xerox ColorQube 9200 series Three Tiered Billing.

Rafael Diaz et al., Hybrid Color Plan White Paper Phaser 8860/8860MFP, Xerox Corporation, May 2008.

Kelly, Dwight "Ten Ways to Improve Color Management", Plant Graphics, Philadelphia, Mar. 2008, vol. 8, Iss 3, p. 34, 2 pgs.

Kartheek Chandu et al.; A Mutual Information Based Automatic Registration and Analysis Algorithm for Defect Identification in Printed Documents, Image Processing 2007-ICIP 2007-IEEE International Conference, Oct. 17, 2007, Rochester Institute of Technology, Rochester New York.

Xing Li, U.S. Appl. No. 12/962,298, filed Dec. 7, 2010.

* cited by examiner

INTEGRATED COLOR DETECTION AND COLOR PIXEL COUNTING FOR BILLING

BACKGROUND

1. Field

The present disclosure is generally related to choosing a billing structure based on an amount of color in a document, and, in particular, to a system and method for determining a billing structure for outputting documents based on color detection and color pixel counting using a windowing technique.

2. Description of Related Art

Image data comprises a number of pixels having a number of components that contribute to defining the image, such as color and intensity. The image data generally includes various color or gray levels, which contribute to the intensity of each pixel in the image. Each pixel of the image is assigned a number representing the amount of light or gray level for that space at that particular spot; i.e., the shade of gray in the pixel. Binary image data has two possible values for each pixel, ON (represented by the number "1") or OFF (represented by the number "0"). The pixels in a color image may be defined in terms of a color space, typically with a number of values or planes, such as three (e.g. RGB, CIELab) or four (e.g., CMYK-C for cyan, M for magenta, Y for yellow, and K for black).

When outputting image data to an output device (e.g., copier, printer, or multi-function device (MFD)), a percentage scale may be used to identify how much ink is employed for a print job. Such information may typically be used for billing a customer for print jobs. For example, some methods employ a billing strategy based on an estimated amount of ink or toner consumption; others bill customers based on a print mode selection (e.g., draft, standard, color, enhanced, etc.) of the output device. In dynamic print job environments, because printing using black ink or toner is less expensive than using colored ink or toner, billing is often based on the amount of color content contained in the job to be printed. In order to bill customers for color printing, color detection is an important feature required in an image path. Color detection is used to analyze documents for presence of color as well as an amount of color in order to bill customers accordingly. Generally, the higher the presence and amount of color in a document, the higher the cost.

Some systems include counting the number of pixels in the image data of the document to be printed. For example, a number of binary pixels associated with the CMYK color planes may be counted to determine a pixel count for each category of color at the time of marking for output in the image path. Generally, with existing color detection and counting methods, a pixel will be labeled as color when the presence of any one of the C, M, and Y signals is detected. U.S. Pat. No. 8,117,134, filed Oct. 16, 2008 by the same Assignee (Xerox Corporation), which is hereby incorporated by reference in its entirety, proposes a way to count color pixels. In solid ink and ink jet products, however, neutral areas of an image are often rendered neutral with a combination of cyan, magenta, yellow, black (CMYK) toner/ink when printing or copying. This can create problems in billing based strictly on marking pixel counts since these "gray" counts may be composed of color toners that mimic gray but are counted towards color. For billing purposes, it is not desirable to charge customer for color pixels that were (are) supposed to be gray. The above-referenced '134 patent, for example, has limitations in handling binary image data.

For copy path images, the C, M, and Y values of a pixel in a composite gray area could be quite different. In such images, many of these pixels can be labeled as color (they may be rendered neutral gray), and thus counted as color pixels, which therefore skews the results used to determine the bill for outputting the document. In a multi-tier billing system, for example, pages/documents are placed into different tiers based on the amount of color content therein. Therefore, the customer may be billed for printing the document at a higher rate even though the output document reflects color pixels that are neutralized or gray. Customers do not wish to be billed for gray or neutral pages if the color is not visible to the human eye on the output document.

Accordingly, an improved system and method of determining the amount of color content in a document and more accurately billing customers is desirable.

SUMMARY

One aspect of the disclosure provides a processor-implemented method for color pixel counting in documents comprising at least one page using an image processing apparatus, the image processing apparatus comprising at least one processor for processing documents containing image data comprising a plurality of pixels, the method comprising the following acts implemented by the at least one processor:

receiving image data of a document comprising a plurality of pixels;

determining a billable count of color pixels in the received image data by establishing windows in the image data comprising M rows and N columns of pixels, and, for each window:

calculating an area coverage of color pixels by counting a number of pixels with at least one color plane ON;

performing color detection by counting a number of ON pixels in each color plane;

determining if the window is color or neutral based on at least the counts of ON pixels in each color plane, and if the window is determined as color, adding the count of the number of pixels from the area coverage calculation to the billable count of color pixels, else, adding the count of the number of pixels from the area coverage calculation to a neutral pixel count.

Another aspect of the disclosure provides a system for color pixel counting in documents comprising at least one page using an image processing apparatus. The system has: an input device for receiving a document containing image data, the image data comprising a plurality of pixels, and at least one processor comprising an input and an output associated with the image processing apparatus for processing the pixels of the image data. The at least one processor is configured to: determine a billable count of color pixels in received image data by establishing windows in the image data comprising M rows and N columns of pixels, and, for each window: calculate an area coverage of color pixels by counting a number of pixels with at least one color plane ON; perform color detection by counting a number of ON pixels in each color plane; determine if the window is color or neutral based on at least the counts of ON pixels in each color plane, and if the window is determined as color, add the count of the number of pixels from the area coverage calculation to the billable count of color pixels, else, add the count of the number of pixels from the area coverage calculation to a neutral pixel count.

Yet another aspect of the disclosure provides a non-transitory computer readable medium having instructions that, when executed by a computer, directs a computer to perform a method for color pixel counting in documents using an image processing apparatus, the method comprising:

receiving image data of a document comprising a plurality of pixels;

determining a billable count of color pixels in the received image data by establishing windows in the image data comprising M rows and N columns of pixels, and, for each window:

calculating an area coverage of color pixels by counting a number of pixels with at least one color plane ON;

performing color detection by counting a number of ON pixels in each color plane;

determining if the window is color or neutral based on at least the counts of ON pixels in each color plane, and if the window is determined as color, adding the count of the number of pixels from the area coverage calculation to the billable count of color pixels, else, adding the count of the number of pixels from the area coverage calculation to a neutral pixel count.

Other features and advantages of the present disclosure will become apparent from the following detailed description, the accompanying drawings, and the appended claims.

DETAILED DESCRIPTION

This disclosure uses algorithms, methods, and processing elements (e.g., hardware) in multi-function systems/devices to determine a billing structure taking the above problems (e.g., overcharging for color documents that are not visibly colorful) into consideration.

Throughout this disclosure, neutral and non-neutral (i.e., color) pixels are used as elements for determining billing structures (and/or estimating billing costs). The term "pixel" as used herein is defined as an element of data that may be provided in any format, color space, or compression state which is associated with or readily convertible into data that can be associated with a small area or spot in an image that is printed or displayed. Generally, a pixel is defined in terms of value (or brightness or intensity) and its position in an image. A pixel may be associated with an array of other small areas or spots within an image, including a portion of an image, such as a color separation plane. An image generally comprises a plurality of pixels having a number of components that contribute to defining the image when it is either printed or displayed.

The term "non-neutral" or "color" pixel as used herein is defined as a pixel that comprises at least one visible color from a color set (e.g., when output). For example, a color pixel may comprise one or more colors such as cyan ("C"), magenta ("M"), and/or yellow ("Y"). The term "neutral pixel" as used herein is defined as a pixel that is black (e.g., when output) or rendered gray or neutral during processing, such when using as black ("K") colorant or a combination of colors and/or black to form composite black (formed from a combination of "CMYK") or grayed pixel. For example, pixels, when output on a document, may be rendered gray using black/composite black ink or toner, or rendered gray by applying another color component therewith. In an embodiment, thresholds may be used to determine if a pixel identified as a neutral pixel or a non-neutral/color pixel.

The color spaces or color planes as used herein that are associated with device independent image data, device dependent image data, binary image data, and/or contone image data should not be limiting. For example, in an embodiment, device independent image data may be in L*a*b or sRGB space. Similarly, for example, in an embodiment, device dependent image data may be in CMYK space.

As discussed above, a direct counting method fails to consider pixels that are visibly rendered gray or neutral to the human eye when output on a page. This disclosure proposes an integrated way of counting color pixels, so that pixels that are rendered neutral with the addition of composite black (i.e., in device dependent space or the binary domain during marking) are not counted as color when determining a billing structure for a customer or a user. This disclosure also provides neutral/color detection results for areas or windows in conjunction with individual color counts to derive a billing structure/strategy for the image data (of a page or a document) being processed. Although there are exemplary embodiments described herein, it is to be understood that such embodiments are not meant to be limiting.

Figure 1A:
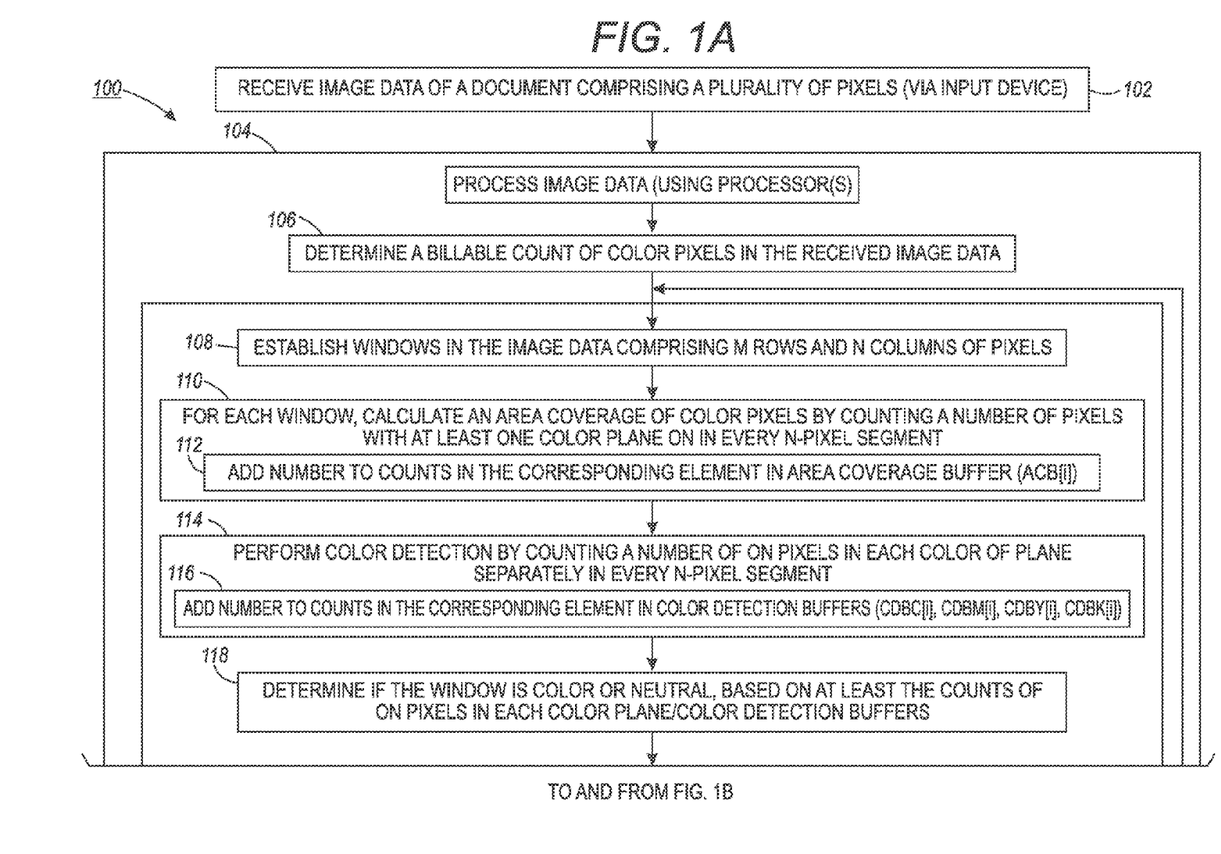
FIG. 1 illustrates a flow chart/block diagram illustrating a method for color pixel counting in documents in accordance with an embodiment of the present disclosure.
Figure 1B:
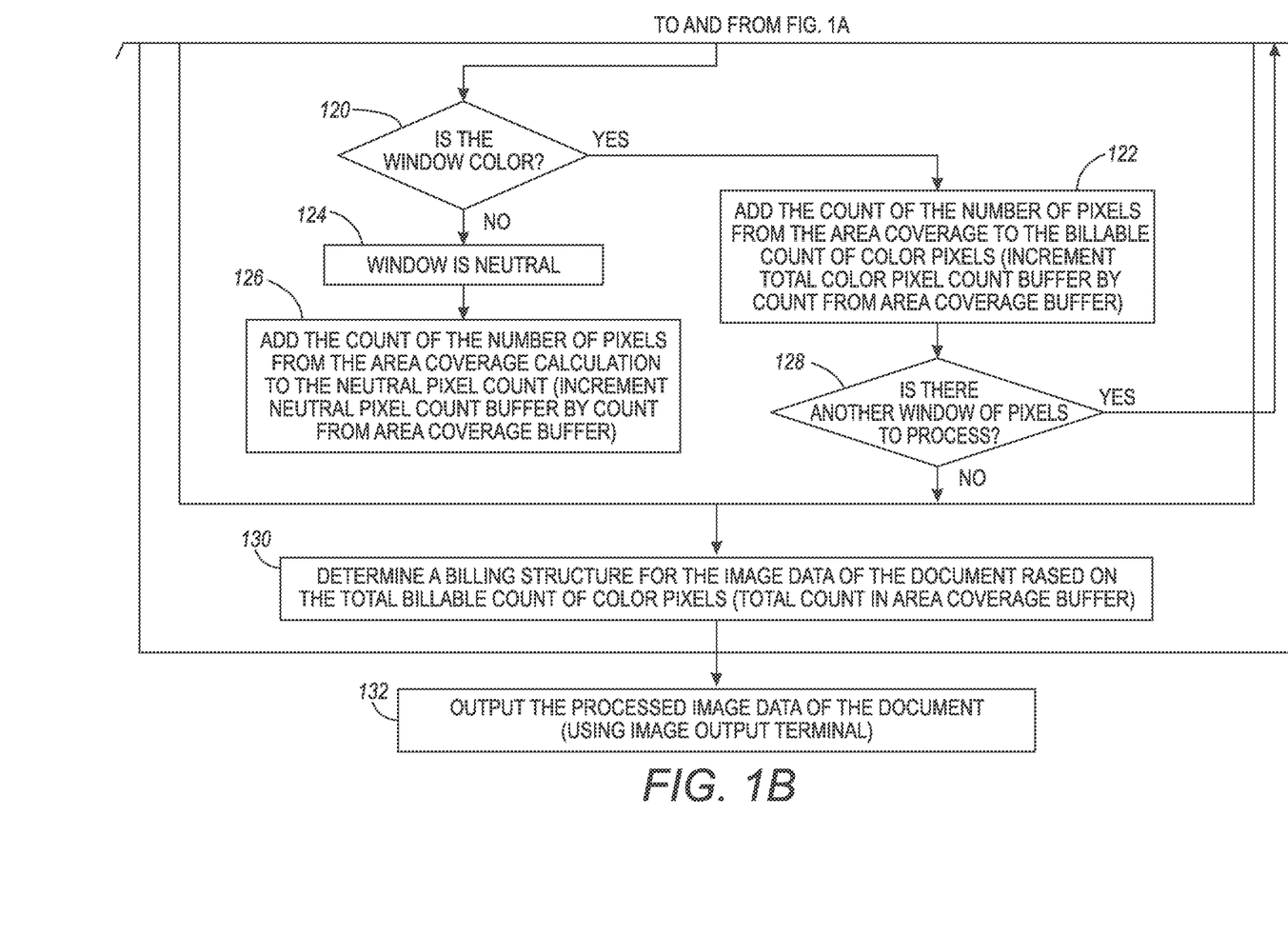

In order to reduce or prevent potential billing problems with regards to billing customers for color pixels that do not visually appear to the human eye to contain color, the present disclosure provides a method 100 for determining a billing structure for outputting documents based on a determined billable color pixel count of the image data in the output document/page, as shown in FIG. 1. Generally, a billing structure is a method by which a charge to a user or customer for printing a document is calculated. A billing structure may be a calculation method associated with or correlated with tiers, thresholds, values, or algorithms, for example. Further details regarding tiered billing structures are discussed below with reference to blocks 402-412 in FIG. 4.

In the described example embodiments, the executed billing plans are designed to bill for color content (text, objects, areas) that only appears to be color to the human eye when output, and thus exclude the rendered neutral or gray pixels (and/or objects, neighborhoods, or areas of those pixels) that do not appear as color when calculating the billable color pixel count for a document (or page). The exemplary embodiments herein are described with reference to counting non-neutral or color (C, M, Y) pixels and neutral (gray) pixels. However, the billing structure or costs are configured to be determined without including types of rendered neutral or gray pixels in the billable count (but should not be limiting). The actual color of the pixel (or combination of colors, e.g., in a neighborhood, window, or area) is used directly and indirectly to determine the billable count of color pixels (and thus the selected billing structure).

Figure 3:
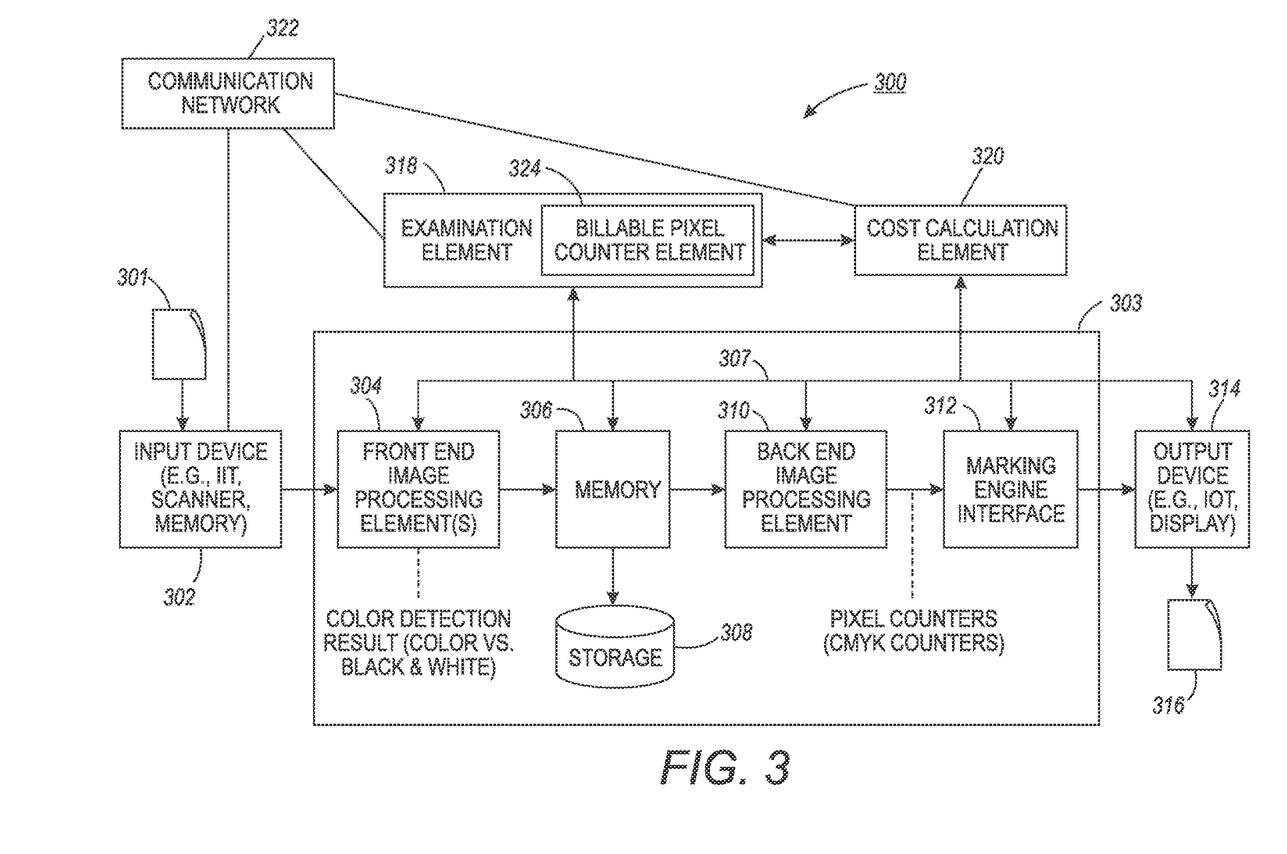
FIG. 3 illustrates a flow chart/block diagram illustrating exemplary processing modules in an image path for implementing the method of FIG. 1 in accordance with an embodiment of the present disclosure.

Referring back to FIG. 1, illustrated is a flow chart/block diagram illustrating a method for color pixel counting in documents for billing in accordance with an embodiment of the present disclosure. Each of the method steps that are shown in FIG. 1 and throughout this disclosure may be implemented by a computer or a processor, for example, and are not meant to be limiting. For example, the elements or modules as shown in FIG. 3 may implement the herein described methods.

Method 100 begins at 102 in which an output device/image processing apparatus receives a document comprising at least one page of image data. The image data comprises a plurality of pixels. The received image data in 102 is representative of any type of page or document and may include a variety of objects to be detected and used by method 100; however, method 100 may use a document that includes any combination of objects (including text). After receiving image data in 102, the image data is processed at 104 using at least one processor. Such processing may include transforming the input image data into device dependent space, for example, among other steps that are known in the art and not discussed in detail here. A method for determining a billable count of color pixels in the received image data is implemented at 106. This includes establishing windows in the image data comprising M rows and N columns of pixels, as shown at 108. As is generally known by those skilled in the art, the direction in which the image or image bearing surface of the system moves is referred to as the process direction, and the direction in which the plurality of sensors are oriented is referred to as the cross-process direction. The cross-process direction is generally perpendicular to the process direction. Throughout this disclosure, M refers to the lines or rows in the process (or slow scan) direction and N refers to the number of columns in the cross-process (or fast scan) direction. As detailed further below, in the herein disclosed method, for each window M×N, each input line is divided into a number of N-pixel segments and the data from each segment is processed. Once M lines are reached, a decision for the array of windows is made.

Each M×N window of image data is processed by calculating an area coverage of color pixels by counting a number of pixels with at least one color plane ON, as shown at 110. The number can be added at 112 to a count in an area coverage buffer of the system. The area coverage buffer is an array with each element corresponding to one window in the fast scan direction, or the M-pixel segment. Also, color detection is performing by counting a number of ON pixels in each color plane, as shown at 114. These numbers can be added at 114 to counts in individual color detection buffers of the system. Once the counts at 110 and 114 are determined, the pixels of image data are then processed at 118 to determine if the window is color or neutral based on at least the counts of ON pixels in each color plane, i.e., the total number of "at least one plane on" pixels (from 110) are/will be counted toward color pixels; the counts determined at 114. For example, each pixel may be analyzed and/or compared to thresholds. Examples of methods for determining whether a window is neutral or color are described further below (see description of FIG. 2). However, the methods or steps for determining if a window/pixel is neutral or not should not be limiting. Any number of neutral pixel determination methods may be implemented with this disclosure that currently exist or that are developed in the future.

As shown at 120, the results of the neutrality determination are used. It is determined if the window is color. If YES, the count of the number of pixels from the area coverage calculation at 110 is added to the billable count of color pixels, as shown at 122. This can be done by incrementing a total color pixel counter/buffer by the count from the area coverage buffer, for example. Otherwise, if the window is not color, i.e., NO at 120, then the window is determined to be neutral at 124, and the count of the number of pixels from the area coverage calculation is added to a neutral pixel count, as shown at 126. This can be done by incrementing a neutral pixel counter/buffer by the count from the area coverage buffer, for example.

After step 122 or 126, it is determined if there is another window of pixels to process. If YES, a new window of image data is processed starting at step 110, since each of the windows are used to determine a billable pixel count of color pixels. Once all of the image data is processed, i.e., NO at 128, then the billable count of color pixels in the received image data can be used to determine a billing structure. The billable color pixel count is based on at least the pixels determined to be color (the total billable count of color pixels). At 130, a billing structure is determined based on the billable pixel count.

Optionally, after the billing structure is determined at 130, the processed image data may be marked and output using an output device or IOT, as shown at 132.

In the above method, the billable count of color pixels from the total color pixel count buffer (also referred to throughout this disclosure as "billable color pixel count") is used to determine the billing structure for outputting the page. The billing structures used with the image processing apparatus or output device should not be limiting. In an embodiment, it is envisioned that the billing structure(s) may be determined or based on a threshold value. For example, in an embodiment, the chosen or determined billing structure is based on the number of color pixels to be output/marked in device dependent space as compared to a threshold. In another embodiment, the determined billing structure is based on a ratio or percentage of color image data comprising an amount equal to or higher than a percentage threshold.

Figure 4:
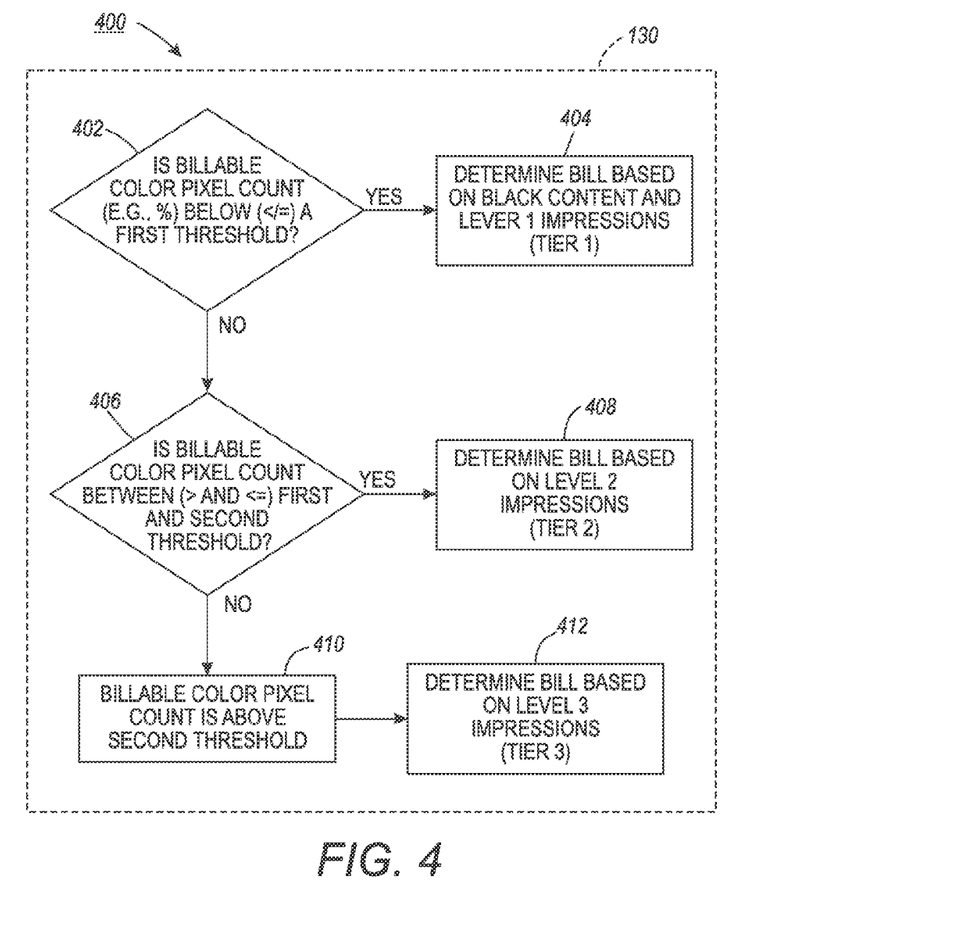
FIG. 4 illustrates an example of a method for determining a billing structure in a 3-tier threshold billing structure.

In another embodiment, the billing structure is based on a multi-tiered threshold value. The multi-tiered threshold value may be determined using the color coverage ratio or percentage on a page. That is, the color coverage may be measured or weighed with reference to an estimated total color value. Based on such measurements or weights, the page or document may be billed by choosing a billing structure associated with a tier (e.g., Tier-1, Tier-2, Tier-3) based on the number of satisfied thresholds. That is, one or more thresholds may be used to separate billing tiers which may be used to charge a customer. Such multi-tier bill plans provide options to the customer which better match types of printed documents and workflows. Additionally, two-tier and three-tier meter billing plans may replace black-only and color-only billing structures, which is more satisfactory for the customer and supplier. FIG. 4 and its corresponding description below illustrate a method 400 for determining and/or selecting a billing tier at which to bill for outputting the received image data.

Figure 2:
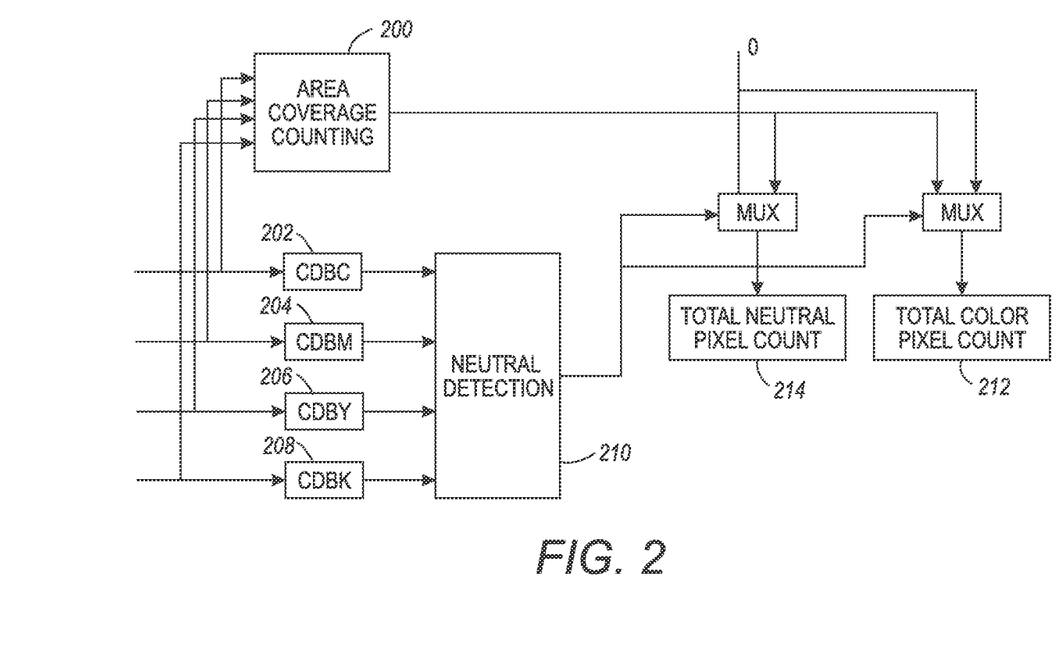
FIG. 2 illustrates exemplary control diagram of counters and buffers for counting color pixels (in binary domain) to determine a billable count of color pixels in image data.

FIG. 2 illustrates exemplary control diagram of counters and buffers for counting color pixels (in binary domain) to determine a billable count of color pixels. For example, the following counters and buffers may be provided: an Area Coverage Counting buffer (acb[i]) 200, individual color detection buffers such as: a Cyan buffer cdbC[i] 202, a Magenta buffer cdbM[i] 204, a Yellow buffer cdbY[i] 206, a Black buffer cdbK[i], and pixel counters: Total Color Pixel Counter 212 and Neutral Pixel Counter 214. All of the buffers are of (fast scan length×fast scan resolution)/N elements (N being an integer). In an embodiment, the individual color detection buffers are provided into one consolidated buffer with the capability of storing the data related to each color plane. In accordance with the illustrated embodiment, for received image data, an M×N window is established in the image data (M rows of pixels in the process direction and N columns of pixels in the cross process direction). For each window, and input line of image data, an area coverage of color pixels is determined by counting a number of pixels with at least one color plane (e.g., C, M, or Y) ON in every N-pixel segment (see 110 in method 100). That is, the Area Coverage counting buffer 200 receives data related to the original input image. That number can be added to the count in the corresponding element in the Area Coverage counting buffer 200. For example, assuming N and M are set to 16, i.e., using a window of 16×16, it may be determined that there are ten (10) instances of pixels with at least one color plane ON (e.g., ten counts) in the image data. This count will be added to the corresponding count being held in the Area Coverage counting buffer 200.

The individual color buffers are designed to perform color detection in the image data by counting a number of ON pixels in each separate color plane in every N-pixel segment. That number can be added to the count in the corresponding elements in each of the color detection buffers 202-208. For example, using a window of 16×16, it may be determined that there are 16 instances of C, 8 instances of M, 8 instances of Y, and 2 instances of K. Each of these counts will be added to the counts of the corresponding C, M, Y, and K buffers 202-208.

At the end of every M lines, the counts can be read and updated or incremented with additional numbers as new lines are processed. As further detailed below, the area coverage measurement will be counted towards a color or a black & white/gray/neutral count on the color detection result at end of processing each window.

More specifically, the information gathered by the buffers 200-208 for each window is used to determine the total billable pixel count of color pixels (counted by counter 212), and, alternatively, the total count of neutral pixels (by counter 214) in the image data. After analyzing the pixels in a window, the neutrality of every M×N window—i.e., is the window color or neutral—is determined based on at least the data in the C, M, Y, and K buffers 202-208 (i.e., based on the count/number of ON pixels in each color plane). That is, as generally shown in FIG. 2, the data from buffers 202, 204, 206, and 208 is sent to a neutral detection module 210 for processing and analysis.

In an embodiment, gray balance based adjustments can be applied during the neutrality determination. In an embodiment, the determination of the window being color or neutral includes applying a neutral pixel determination algorithm to the image data. Existing methods for neutral detection can be used to determine neutrality of the pixels in the window, either or both individually or as a group. For example, methods and algorithms such as those described in U.S. Pat. No. 7,903,285, filed Feb. 5, 2008 and issued on Mar. 8, 2011 and/or U.S. Pat. No. 7,755,800, filed Feb. 5, 2008 and issued on Jul. 13, 2010, both of which are assigned to the same assignee, Xerox Corporation, and both of which are incorporated by reference in their entirety herein, may be used to determine the neutrality of each window. However, such methods are not limiting. Other algorithms may be used.

For example, the following are two examples of neutral detection that may be implemented by neutral detection module 210 for gray balance adjustment. In variant 1, gray balance adjustment is performed by adding an offset to C, M, Y (before adding the threshold comparison). For example, a density estimate is performed on the input data (e.g., by looking at min(C,M,Y)+K) and the input is placed into one of four density categories (based on densityThreshold comparison). Different gray balance adjustment(s) can be applied (e.g., different offsets, offset1 through offset4) based on the estimated density. The color measure in the form of max(C, M, Y)−min(C, M, Y), with gray balance adjustment applied (+offset), is compared against a threshold (colorThreshold) to determine neutral vs. color for the window:

Neutral Detection Variant 1
If 0<min(C, M, Y)+K<=densityThreshold1
If max (C+offsetC1, M+offsetM1, Y+offsetY1)−min (C+offsetC1, M+offsetM1, Y+offsetY1)<colorThreshold1
Then label the pixel/window as neutral
Else if densityThreshold1<min(C, M, Y)+K<=densityThreshold2
If max (C+offsetC2, M+offsetM2, Y+offsetY2)−min (C+offsetC2, M+offsetM2, Y+offsetY2)<colorThreshold2
Then label the pixel/window as neutral
Else if densityThreshold2<min(C, M, Y)+K<=densityThreshold3
If max (C+offsetC3, M+offsetM3, Y+offsetY3)−min (C+offsetC3, M+offsetM3, Y+offsetY3)<colorThreshold3
Then label the pixel/window as neutral
Else
If max (C+offsetC4, M+offsetM4, Y+offsetY4)−min (C+offsetC4, M+offsetM4, Y+offsetY4)<colorThreshold4
Then label the pixel/window as neutral
If max(C, M, Y)<kOnlyThreshold, or
If K+min(C, M, Y)>compositeKThreshold
Then label the pixel/window as neutral
where each of offsetC1, offsetM1, offsetY1, offsetC2, offsetM2, offsetY2, offsetC3, offsetM3, offsetY3, offsetC4, offsetM4, and offsetY4 are predetermined offsets,
where densityThreshold1, densityThreshold2, and densityThreshold3 are successively increasing predetermined thresholds (e.g., percentages) for color density.
where colorThreshold1, colorThreshold2, colorThreshold3, and colorThreshold4 are predetermined thresholds (e.g., percentages) for color thresholds in a window, which can be different depending on the estimated density level of the input data,
where kOnlyThreshold is a predetermined threshold for pixels of black only, and
where compositeKThreshold is a predetermined threshold for pixels rendered black using two or more of C, M, and/or Y.

Items such as offsetC1, offsetC2, etc. are parameters used for gray balance adjustment. In accordance with an embodiment, one or more of the following parameters are programmable parameters: densityThreshold1, offsetC1, offsetM1, offsetY1, colorThreshold1, densityThreshold2, offsetC2, offsetM2, offsetY2, colorThreshold2, densityThreshold3, offsetC3, offsetM3, offsetY3, colorThreshold3, offsetC4, offsetM4, offsetY4, colorThreshold4, kOnlyThreshold, and/or compositeKThreshold. However, this list is exemplary and not meant to be limiting.

As another example for gray balance adjustment, a look up table based adjustment can be made before the comparison. In variant 2, in order for a pixel (or a window) to be called or labeled neutral, the CMY values should show some kind of (known) relationship, and that relationship could be different at different pixel levels. So, if the pixel is neutral, then given a particular M value, (the range of) the C and Y values can be determined. If the input C and Y values are quite different from the values expected of a neutral pixel (given the M as the anchor point), then the pixel is not neutral:

Neutral Detection Variant 2
Use M to look up Cgray and Ygray:
Cgray=grayC[M]
Ygray=grayM[M]
Use (cdbM>>1) to look up Cmargin and Ymargin
Cmargin=marginC[M>>1]
Ymargin=marginY[M>>1]

The window is classified as neutral if the following conditions are all met:

|C−Cgray|<Cmargin
|Y−Ygray|<Ymargin where grayC and grayM are 256-element 8-bit arrays and wherein marginC and marginM are 128-element 7-bit arrays.].

Items such as grayC, grayM, etc. are parameters used for gray balance adjustment. In accordance with an embodiment, one or more of the following parameters are programmable parameters: grayC, grayM, marginC, and marginY. However, this list is exemplary and not meant to be limiting.

Accordingly, while the conditions and parameters for the above exemplary variants are different, the detection results, i.e., if the window neutral or color, are not differentiated. That is, the results are both similar—either neutral or color.

Referring back to FIG. 2, the results of the neutrality determination are then processed with the counts from the Area Coverage Counting buffer 200 (e.g., using the MUX). The decision for whether a window is neutral or color is based off of the neutral detection results from counter 210. If the window is determined or detected as color, the count of the number of pixels from the area coverage calculation (from Area Coverage buffer 200) is added to the count in the Total color Pixel Counter 212, i.e., increment Total Color Pixel Count by acb[i]. Otherwise, the window is determined to be neutral. In an embodiment, the count of the number of pixels from the Area Coverage calculation (from Area Coverage buffer 200) is added to the count in a Neutral Pixel Count Counter 214 (optional), i.e., increment Neutral Pixel Count by acb[i].

Using the example previously mentioned, for example, if the M×N window is determined to be color, the corresponding count being held in the Area Coverage buffer 200 (i.e., corresponding to 10 instances of pixels with at least one color plane ON), is added to the Total Color Pixel Counter 212.

Once there are no further windows of image data to process, then the data/counts from the Total Color Pixel Counter 212 can be used to determine a billing structure (see 130 in method 100) for the image data.

In accordance with an embodiment, a control device (not shown in FIG. 2) may also be provided to work cooperatively with processor(s), counters, and buffers. The control device may be a programmable register that is used to control the buffers and counters, i.e., how the counting of pixels is controlled.

In accordance with an embodiment, M and N are set to 16. The max fast scan length is 18 inches and the max fast scan resolution is 600 dpi. The size of each of the 5 buffers (Area Coverage buffer 200 and individual color detection buffers 202-208) is 675 elements×8 bits, or a total of 27,000 bits. Although the count value in each 16×16 tile could reach 256, the value that includes the last row of the M×N window need not be stored in acb[i].

The size of the buffers as disclosed herein does not need to be increased for images of higher resolution. Rather, the size of the window (e.g., the number of rows, M) can be adjusted accordingly for processing. The bit depth of the buffers can be sized based on a largest possible window size for processing, or scaled (up or down) so that the counts (determined in area coverage and/or by the individual color detection buffers) fit into a certain bit depth limit.

Accordingly, this disclosure provides an integrated method for color detection and color pixel counting. It operates on the binary domain and can be used for both copy path and print path images. It can handle composite gray image data either in the original document (as received), or image data generated in the rendering process. The proposed method solves the problem of color detection and color pixel counting with composite gray (to be used for billing) in the copy path as well as in the binary print path, and without using significant amount of hardware resource(s). The amount of memory needed to implement the disclosed method is minimal because it only requires use of two or more buffers designed to store intermediate data at very low resolution.

From a customer point of view, the method disclosed herein not only avoids the mistake of billing a visibly neutral page or gray pixels as color, but also determined an accurate billing structure based on visibly output color.

The herein described methods may be used by any MFD (or printer or copier) manufacturing companies that wish to implement image paths capable of counting color pixels and implementing a neutral detection algorithm.

FIG. 3 illustrates a block diagram of an example of an image path 300 for processing image data as disclosed herein of a system, device or image processing apparatus 303, such as an MFD. The system/device/apparatus 303 comprises, among other devices, an input device (e.g., IIT or memory) 302, a processor or processing elements represented by 304 and 310, a memory 306 and/or a storage device 308, and an output device (e.g., IOT) 314 and/or marking engine interface 312. The image path 300 of the system 303 may also include an examination element 318 and/or cost calculation element 320 which may be a part of the system 303 itself or in communication with the processing elements 304 and 310, for example. Generally, the above elements (as will be described) of the device are provided to perform functions that assist in receiving image data such as a scanned document, configuring the image path of the processing elements 304 and 310 (and possibly elements 318 and 320) to process the image data, and, if needed, outputting the image data such as by printing a document according to an output mode that may be selected. However, it should be noted that the apparatus or device may comprise additional elements not described herein or alternative elements for performing similar functions, and should not be limited to those elements as illustrated in FIG. 3.

The input device 302 is used to deliver image data of a document to the system 303 and/or processing elements in the image path. In some embodiments, the input device 302 is used to scan or acquire an input document 301 or page into image data, such as when copying a document, for example. The input device 302 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 302 may include submission of electronic data by any means and should not be limiting. In other embodiments, the input device 302 may be an electronic device for inputting electronic image data. In some embodiments, input device 302 may be connected to a network 322 or telephone system, for example, to receive as input image data such as via a facsimile (fax) machine or computer (CPU). Input documents and/or image data that is received electronically may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

If needed, the input or received image data may be converted using the input device 302 and/or processing elements in the apparatus 303. For example, in embodiments, the image data may be converted from device dependent space to device independent space (e.g., sRGB to L*a*b). Alternatively, the image data may be received in device independent space (e.g., L*a*b or PostScript). The type of image data received and the type of input devices documents are received therefrom should not be limiting.

In any case, image data, such as image data for an original document 301, may be received or input in either device dependent or device independent space from the input device 302, depending on the capability of the input device or the architecture of the system. The input device 302 may capture image data as binary or contone image data, for example. Generally, when the input image data from the input device is received in device dependent space, the processing elements in the image path will typically convert such image data to some device independent space for further processing before converting the image data to device dependent space (e.g., to be output). However, the data may be processed in any format.

FIG. 3 also shows one or more processors or processing elements for processing and/or manipulating image data using a plurality of operations and/or processes. The description of the processing elements below is an example of devices capable of implementing processes to be performed and should not be limiting. For example, additional processing elements may be provided along the image path 300. Additionally and/or alternatively, additional operations may be performed on the image data other than or in addition to those described herein.

The image path 300 of system 303 may comprise one or a plurality of image processing elements (or processor(s)) for manipulating image data received from the input device 302 using a plurality of operations and/or processes. The processing elements may be a combination of image processing elements which comprise software and hardware elements that perform a number of operations on the image data received from the input device 302 (e.g., IIT/scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multi-function device (MFD). The terms "processing element" or "processor" are used interchangeably throughout this disclosure and refer to one or more elements capable of executing machine executable program instructions. It is to be understood that any number of processing elements may be used and that additional operations or processes besides those described below may be provided in an image path.

More specifically, the image path of FIG. 3 comprises a front end processing element(s) 304, a memory 306, storage 308, and a back end processing element(s) 310. Each of the devices or elements in the image path may be communication with each other, as represented by path 307. The front end processing element(s) 304 may comprise any number of processing elements/modules and is/are image processing elements that receive image data in a beginning of an image path and is/are used to process the image data according to user preferences such that it may be stored and later retrieved for output and according to the method described herein. The back end processing element(s) 310 may comprise any number of processing elements/modules and is/are generally used at the end of an image path to retrieve stored image data and to process the image data such that the image data may be output to a printing device as an accurate recreation of the original input or scanned image. Of course, processing elements may also be used for compression and/or decompression of image data.

In an embodiment, one or more of the elements (e.g., processing elements 304, 310 and memory 306/storage 308) of system 303 may be connected to a network 322 or telephone system, for example, for communication with other devices, systems, or apparatuses. For example, in some cases, image data or executable instructions may be provided via a computer (CPU) connected to the network 322. As further described below, in a possible embodiment, at least one processing element of system 303 may implement an operative set of processor executable instructions of a billing system. Such a billing system or the executable instructions may be provided via the network 322, for example.

Each of the image processing elements comprises an input and an output. Additionally, the system, device, or apparatus may also include one or more controllers or routers (not shown) to select and route the image data between the processing elements 304 and 310 and memory 306 and/or storage 308, and other elements described below, for example.

Front end processing element(s) 304 receives (e.g., as input) the image data from the input device 302 and processes the image data. The image data may be received as input via a scanning engine interface, for example, such as when copying and turning a hard copy document into image data. Alternatively, the image data may be received electronically, such as from a memory device, storage device (portable or remote), et al., such as when printing a saved document. As such, the form in which image data is received should not be limiting. Front end processing element(s) 304 may be used to process the scanned image data as well as determine user-defined operations generally known in the art. For example, the front end processing element 304 may be used for color space conversion, reduction or enlargement, document registration, and/or performing other operations or processes on the image data, for example. In some embodiments, the front end processing element 304 converts the image data (e.g., from device dependent to device independent image data, when received via a scanner) for processing and determines neutral and non-neutral (color) pixels. In the herein disclosed method, front end processing element 304 may be used (alone or in cooperation with other elements) to determine a billing structure, such as noted at 130 of the method 100 in FIG. 1.

Memory 306 and/or storage 308 may be used to store image data. For example, memory 306 and/or storage 308 may be used to temporarily store the original image data of document input via input device 302. Converted (e.g., binary to contone image data) or compressed image data may also be stored in the memory 306 and/or storage 308. Memory 306 and/or storage 308 may be used to store machine readable instructions to be executed by the processor/processing elements. The memory 306 and/or storage 308 may be implemented using static or dynamic RAM (random access memory), a floppy disk and disk drive, a writable optical disk and disk drive, a hard disk and disk drive, flash memory, or the like, and may be distributed among separate memory components. The memory 306 and/or storage 308 can also include read only memory, or other removable storage drive(s) or memory devices.

The front end processing element(s) 304 may communicate with memory 306 and/or storage 308 of system/apparatus 300 to store processed and/or compressed image data, for example. Compressed image data may be stored in memory 306 and/or storage 308 temporarily or for a later time when needed. When the image data is needed or it is time for marking (e.g., using the marking engine interface 312 or output device 314), the image data may be retrieved from memory 306 and/or storage 308 via the back end processing element(s) 310 to export the image data that has been scanned, for example.

Back end processing element(s) 310 receives processed image data from the memory 306 or storage 308. Back end processing element (s) 310 may be used to further render the image data for output. For example, back end processing element 310 may be used to convert the color space of the processed image data (e.g., convert from device independent CIE L*a*b color space to device dependent CMYK color space), provide color balance, further rendering, filtering, and/or other operations or processes. Subsequently, back end processing element(s) 310 may be used to decompress the image data and output the image data via the IOT 312 and/or output device 314. The output of processed image data from the back end processing element 310 depends on the image path (or output mode). The back end processing element(s) 310 may be used for calculating the amount of CMY area color coverage, color detection of window, and related counts, such as the method disclosed in FIG. 2, and/or to determine the toner/ink consumption of the output device 314. In another embodiment, front end processing element(s) 304 are used to perform the determinations of the method shown in FIG. 2.

In an embodiment, the processed image data may be directly output to the marking engine interface 312 for printing using an output device 314. The marking engine interface 312 and/or output device 314 may be associated with a printer, a copier, or an MFD which is used for printing documents, or incorporated therein. In some cases, the marking engine interface may be a part of the output device 314. The marking engine interface 312 and/or output device 314 are used to output the processing image data to the printer, for example. Specifically, the marking engine interface 312 may be designed to receive the reconstructed and processed image data in device independent space in order to send or output the image data to the output device 314 (e.g., printer) for a copy or print job. The marking engine interface 312 may further perform image processing on the image data to make corrections or compensate for deviation in the printing process. Alternatively, the back end processing element(s) 310 may be used to perform further image processing on the image data.

The marking engine interface 312 outputs processed image data to the output device 314 for outputting the image data of the document. The type of output device 314 should not be limiting. For example, the output device 314 may comprise an image output terminal (IOT), display, screen, printing device, copying device, MFD, or others devices, as generally noted above. The display or screen may be a part of a computer (CPU) or user interface (UI) or may be provided to relay information from a website or other device via a network 322, for example. In some cases, a UI may be provided directly on the apparatus/device, while in others a UI is provided as a separate electronic device.

In an embodiment, the processed image data may be output to a printer (e.g., drum or roll for applying to paper) to complete the image path, for example. Of course, the algorithms and processes used by the elements in the image path shown in FIG. 3 should not be limiting. Any number of data compression algorithms (e.g., lossless, lossy), decompression algorithms, color conversion algorithms (e.g., contone to binary, or binary to grayscale) and the like may be performed to provide a high quality output document 316.

It should be noted that the output print quality of image data from an output device 314 such as a MFD may depend the type of system or device (and its available output modes/resolution). In some cases, multiple print quality modes (PostScript driver), each with a different resolution, are supported.

In an embodiment, the system or apparatus 303 may further comprise one or more elements for determining a billing structure and/or a billing cost for outputting a page or document via an output device such as device 314. For example, as shown in FIG. 3, an examination element 318 and/or cost calculation element 320 may be provided. In an embodiment, the examination element 318 and/or cost calculation element 320 may be a part of the image data the system 303. In an embodiment, the elements 318 and/or 320 are separate from the image path of the system 303. In an embodiment, the features, calculations, and/or determinations provided by examination element 318 and/or cost calculation element 320 may be incorporated into one or more processing elements, such as elements 304, 310, or 312, and therefore such elements should not be limited to the illustrated embodiment.

Examination element 318 may be configured to examine the image data. The examination element 318 may assist in determining the billable pixel count of color pixels in the image data. For example, the examination element 318 may comprise a billable pixel counter element 324 that is configured to perform any of the calculating and/or counting steps such as shown in method 100 at 110-116, 122 and 126. The examination element 318 may be configured to implement steps such as 108 and 118, and/or 120-128.

The examination element 318 may operatively communicate with a cost calculation element 320. The cost calculation element 320 is configured to calculate a billing cost or an approximate cost for outputting the page and/or document of image data using the billable pixel count of color pixels. The billing cost may be calculated and based on a determined billing structure. For example, if it is determined that a page is to be billed using a Tier-2 of a multi-tiered billing structure, the cost associated with Tier-2 may be employed. The billing structure may be determined by either the examination element 318 or the cost calculation element 320, for example.

In an embodiment, the billing cost is further calculated based on a type of output device to be used. For example, when printing to a printer or MFD, the chosen type of output device may alter the cost for printing the page or document due to the plurality of output modes, inks, toners, and other elements which contribute to the quality of the output document 316. In an embodiment, the cost calculation element 320 is configured to operatively communicate with the examination device 318 and at least one of the processing elements (such as 310 or 312) to calculate a billing cost for outputting the page and/or document.

In a possible embodiment, examination element 318 and cost calculation element 320 are part of a billing system to be implemented by an operative set of processor executable instructions configured for execution by at least one processor or processing element. The billing system may be provided at a remote location with respect to the at least one processor. In an embodiment, the at least one processor is provided in an image processing apparatus, which may comprise an input device for inputting image data and an output device for outputting image data. In an embodiment, the at least one processor of the billing system is provided at a remote location with respect to an output device. As noted above, at least one processing element of system 303 may implement the operative set of processor executable instructions of the billing system by communicating via the network 322, for example. The at least one processing element may thus be provided in the same or a remote location with respect to the output device. In some cases, the examination element 318 and/or cost calculation element 320 may communicate an approximate cost or billing cost to the processor/system 303. In some cases, the examination element 318 and/or cost calculation element 320 may be a part of the processor which communicates with system 303 or an output device.

In a possible embodiment, the cost calculated by the cost calculation element 320 (or its associated processing element) may be sent directly to the output device 314. For example, as shown in FIG. 3, the cost calculation element may communicate via path 307 the approximate billing cost to the output device 314. In this case, the cost may be output via a display, screen, or even a print job. By providing the cost in such a manner—i.e., before outputting the image data via a printing or copying output device—the customer can decide if the image data should be marked via interface 312 and output device 314, or if the data should be saved/discarded (e.g., such as if the cost is too high). The customer may choose to optionally output the image data (e.g., via contact with network 322 or system 303) through the use of an activation button after reviewing the cost, for example (e.g., see FIG. 1 at 132).

Also, it is envisioned that an embodiment in accordance with this disclosure may include a system that utilizes a network connection 322 for proposed billing estimates. For example, a customer may submit a proposed job (e.g., document) to a website such that a cost estimate for outputting (e.g., printing) the job may be provided to the customer via such website. In an embodiment, it is envisioned that the estimate of how much the job will cost may be determined by considering a predetermined type of printing apparatus for output. Depending on the type of device, apparatus, or machine used for output, the cost estimate of the job may differ. Additionally, in an embodiment, it is envisioned that the system and/or website may estimate theoretical costs of the job if the document is printed with alternative type of printing devices or apparatuses, and that such theoretical costs may be presented to the customer (e.g., via the website). These alternative types may include but are not limited to, different brands or types of machines (e.g., company make and model), different output resolutions/capabilities, or different print shops, for example. A system and/or website may utilize a method such as method 100 to estimate such costs, for example. The system may comprise similar elements noted with respect to the image path of the system 300 in FIG. 3, including, but not limited to, a communication device (such as a network), examination element, cost calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example. Such a system is advantageous to a customer as it allows the customer to review theoretical costs before any actual printing or marking occurs. The customer is able to decide, based on a cost estimate, if the job should be output (e.g., printed), without actually outputting the job. Furthermore, the customer may make a decision whether or not to output a job based on types of printing machines. For example, if the system/website includes cost estimates for outputting the job using one or more devices or apparatuses, the customer has the option of choosing a device or apparatus should be used to output the document (or not used), based on the customer's pricing point.

As previously noted, the determined billing structure shown at 130 may be based on a multi-tier threshold value model. FIG. 4 illustrates an example of a general method for determining a billing structure in a 3-tier threshold billing structure. For example, the 3-tier color distribution may include: expressive, useful, and everyday color use. In the illustrated embodiment, the three tiers may be defined as follows: Tier-1: all black and white documents and documents with a small amount of color are billed at black and white rate; documents with more than a small amount of color but less than a large amount of color are billed at a lower than market color impressions rate (everyday color, level 2 impressions); documents with large amounts of color are bill at a competitive market color impressions rate (expressive color, level 3 impressions). To determine or separate such tiers, break-points, percentages, or thresholds may be used. In the illustrated embodiment, the thresholds dividing the tiers may be percentages of color, based on the billable pixel count as compared to a total number of pixels, for example. However, the percentages or thresholds and the methods of defining the percentages or thresholds that are used to determine the tiers (e.g., ratio, percentage, pixel count) should not be limiting.

In any case, FIG. 4 illustrates one process 400 for determining the billing structure in 130 of FIG. 1. Using the billable count of color pixels determined by the total color pixel counter at 122, for example, it is determined, as shown at 402, if the total billable color pixel count is below a first threshold. If yes, the billing structure is determined using a first tier, e.g., Tier-1, based on black content/level 1 impressions, as shown at 404. If the billable pixel count is not below a first threshold, i.e., no, but determined to be between the first and a second threshold as shown at 406, the billing structure for the page is determined based on level 2 impressions in a second tier, e.g., Tier-2, as indicated at 408. If the billable pixel count is not between the first and second thresholds, i.e., no, the coverage is determined to be above the second threshold at 410, and the billing structure for the page is determined based on level 3 impressions of a third tier, e.g., Tier-3, as shown at 412.

Other embodiments include incorporating the above methods into a set of computer executable instructions readable by a computer and stored on a data carrier or otherwise a computer readable medium, such that the method 100 is automated. In a possible embodiment, the methods may be incorporated into an operative set of processor executable instructions configured for execution by at least one processor. FIG. 1 shows a flow chart of such computer readable instructions. For example, in some embodiments, memory or storage of an output device carrying instructions is configured such that when the executable instructions are executed by a computer or processor, they cause a computer or processor to automatically perform a method for determining color content in documents and/or a billing structure for outputting documents. Such instructions may be contained in memory 306, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the methods 100. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

In addition, it should be noted that the system/apparatus 300 may include a display or control panel user interface (UI) that allows a customer to read the billing meter. Meter reads may be used for cost-per-copy pricing, for example. Such meter reads can be obtained by accessing the local user interface on the control panel, or, alternatively, by accessing a remote user interface using an Internet or web connection. For example, a simple interface may be provided that enables a customer or supplier to manage, configure, and monitor networked printers and MFDs from a desktop or laptop using an embedded web server. The location and accessibility of the billing meters on the display/control panel interface should not be limiting. For example, a user may scroll through a list of the billing plans that are available directly on the machine, as well as the billing costs associated therewith, or on a computer. In some cases, the billing meters can also be viewed on a usage profile report. Such a report may be printed or electronic. In the case of an electronic report, for example, one may access such information via a network and an appropriate IP address associated with the device. This information may be accessed via a browser. In an embodiment, the device or system updates the usage in real time. Thus, the billing meters that are accessible via a remote location will match the billing meters of the user interface and its displayed counters.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 303 may be a computer system which includes a bus or other communication mechanism for communicating information, and one or more of its processing elements may be coupled with the bus for processing information. Also, the memory 306 may comprise random access memory (RAM) or other dynamic storage devices and may also be coupled to the bus as storage for the executable instructions. Storage device 308 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for color pixel counting in documents for billing comprising at least one page using an image processing apparatus, the image processing apparatus comprising at least one processor for processing documents containing image data comprising a plurality of pixels, the method comprising the following acts implemented by the at least one processor:
receiving image data of a document comprising a plurality of pixels;
determining a billable count of color pixels in the received image data by establishing windows in the image data comprising M rows and N columns of pixels, and, for each window:
calculating an area coverage of color pixels by (a) counting a first count of color pixels, the counting of the first count comprising counting each color pixel in the window once, wherein each pixel has at least one color plane ON;
performing color detection by (b) counting, for each separate color plane in the window, a second count of color pixels, the counting of the second count comprising individually counting a number of ON pixels in that color plane;
a total of the second counts of color pixels being different than the first count of color pixels for the window;
determining if the window is color or neutral based on at least the second counts, and
if the window is determined as color, adding the first count to the billable count of color pixels,
else, adding the first count to a neutral pixel count.

2. The method according to claim 1, wherein, after the processing of the image data using the windows, the method further comprises determining a billing structure for the image data of the document based on the billable count of color pixels.

3. The method according to claim 2, wherein the determined billing structure is based on a multi-tiered threshold value, and wherein the determining the billing structure comprises selecting a billing tier at which to bill for outputting the received image data.

4. The method according to claim 2, wherein the image processing apparatus further comprises a cost calculation element for calculating billing costs, and wherein the method further comprises:
calculating a billing cost for outputting the document using the cost calculation element based on the selected billing tier.

5. The method according to claim 1, wherein the determination of the window being color or neutral further comprises applying a neutral pixel determination algorithm to the image data.

6. The method according to claim 1, wherein the image processing apparatus further comprises an input device for inputting documents, and wherein the method further comprises:
receiving the image data of the document using the input device, the input device being selected from the group consisting of: an image input terminal, a memory device, or a storage device.

7. The method according to claim 1, wherein the image processing apparatus further comprises an image output terminal for outputting documents, and wherein the method further comprises:
outputting the processed image data of the document using the image output terminal.

8. The method according to claim 1, wherein the method determines counts relating to the color pixels using cyan (C), magenta (M), and yellow (Y) color planes.

9. A system for color pixel counting in documents for billing comprising at least one page using an image processing apparatus, the system comprising:
an input device for receiving a document containing image data, the image data comprising a plurality of pixels; and
at least one processor comprising an input and an output associated with the image processing apparatus for processing the pixels of the image data, wherein the at least one processor is configured to: determine a billable count of color pixels in received image data by establishing windows in the image data comprising M rows and N columns of pixels, and, for each window:
- calculate an area coverage of color pixels by (a) counting a first count of color pixels, the counting of the first count comprising counting each color pixel in the window once, wherein each pixel has at least one color plane ON;
- perform color detection by (b) counting, for each separate color plane in the window, a second count of color pixels, the counting of the second count comprising individually counting a number of ON pixels in that color plane;
- a total of the second counts of color pixels being different than the first count of color pixels for the window;
- determine if the window is color or neutral based on at least the second counts, and
- if the window is determined as color, add the first count to the billable count of color pixels,
- else, add the first count to a neutral pixel count.

10. The system according to claim 9, wherein, after the processing of the image data using the windows, the at least one processor is further configured to determine a billing structure for the image data of the document based on the billable count of color pixels.

11. The system according to claim 10, wherein the determined billing structure is based on a multi-tiered threshold value, and wherein the determination of the billing structure comprises selection of a billing tier at which to bill for outputting the received image data.

12. The system according to claim 11, wherein the image processing apparatus further comprises: a cost calculation element for calculating a billing cost for outputting the document based on the selected billing tier.

13. The system according to claim 9, wherein the determination of the window being color or neutral further comprises applying a neutral pixel determination algorithm to the image data.

14. The system according to claim 9, wherein the input device is selected from the group consisting of: an image input terminal, a memory device, or a storage device.

15. The system according to claim 9, further comprising an output device for outputting a document associated with the image processing apparatus, and wherein the output device is selected from the group consisting of: an image output terminal, a display, a printing device, a copying device, or a multi-function device.

16. The system according to claim 1, wherein the processor determines counts relating to the color pixels using cyan (C), magenta (M), and yellow (Y) color planes.

17. A non-transitory computer readable medium comprising instructions that, when executed by a computer, directs a computer to perform a method for color pixel counting in documents for billing using an image processing apparatus, the method comprising:
- receiving image data of a document comprising a plurality of pixels;
- determining a billable count of color pixels in the received image data by establishing windows in the image data comprising M rows and N columns of pixels, and, for each window:
  - calculating an area coverage of color pixels by (a) counting a first count of color pixels, the counting of the first count comprising counting each color pixel in the window once, wherein each pixel has at least one color plane ON;
  - performing color detection by (b) counting, for each separate color plane in the window, a second count of color pixels, the counting of the second count comprising individually counting a number of ON pixels in that color plane;
  - a total of the second counts of color pixels being different than the first count of color pixels for the window;
  - determining if the window is color or neutral based on at least the second counts, and
  - if the window is determined as color, adding the first count to the billable count of color pixels,
  - else, adding the first count to a neutral pixel count.

18. The medium according to claim 17, wherein, after the processing of the image data using the windows, the method further comprises determining a billing structure for the image data of the document based on the billable count of color pixels.

19. The medium according to claim 18, wherein the determined billing structure is based on a multi-tiered threshold value, and wherein the determining the billing structure comprises selecting a billing tier at which to bill for outputting the received image data.

20. The medium according to claim 17, wherein the method determines counts relating to the color pixels using cyan (C), magenta (M), and yellow (Y) color planes.

* * * * *